United States Patent

Buchla

[11] Patent Number: 5,913,260
[45] Date of Patent: Jun. 15, 1999

[54] SYSTEM AND METHOD FOR DETECTING DEFORMATION OF A MEMBRANE

[75] Inventor: Donald F. Buchla, Berkeley, Calif.

[73] Assignee: Creative Technology, Ltd., Singapore, Singapore

[21] Appl. No.: 08/888,386

[22] Filed: Jul. 7, 1997

Related U.S. Application Data

[63] Continuation-in-part of application No. 08/682,138, Jul. 17, 1996, abandoned.

[51] Int. Cl.$^6$ .................................................... G01B 15/06
[52] U.S. Cl. ............................ 84/724; 84/723; 84/411 R; 250/206.1
[58] Field of Search ............................ 84/723–725, 730, 84/104, 411 R, 414, DIG. 24; 250/206.2, 206.1; 356/375

[56] References Cited

U.S. PATENT DOCUMENTS

| | | |
|---|---|---|
| 4,028,977 | 6/1977 | Ryeczek . |
| 4,322,978 | 4/1982 | Fromm ...................................... 73/705 |
| 4,412,105 | 10/1983 | Muscatell . |
| 4,736,662 | 4/1988 | Yamamoto . |
| 4,815,353 | 3/1989 | Christian . |
| 4,823,170 | 4/1989 | Hansen .................................... 356/375 |
| 4,859,012 | 8/1989 | Cohn ..................................... 350/96.24 |
| 5,072,076 | 12/1991 | Camp, Jr. . |
| 5,214,232 | 5/1993 | Iijima et al. . |
| 5,237,126 | 8/1993 | Curtis et al. . |
| 5,305,017 | 4/1994 | Gerpheide . |
| 5,374,787 | 12/1994 | Miller et al. . |
| 5,543,590 | 8/1996 | Gillespie et al. . |

FOREIGN PATENT DOCUMENTS 0 574 213  12/1993  European Pat. Off. .

OTHER PUBLICATIONS

Alps Electric, Inc., "Alps Glide Point Trackpad," as available on Feb. 19, 1996 at http://www.missouri.edu/~ccat/alpsrev.html, 2 pages.

Electric USA Glide Point, "Introducing the Alps GlidePoint (R)," Screen 1 and Screen 2, as available on Feb. 19, 1996 at http://www.alpsusa.com/glidepnt.html, 5 pages.

MacKenzie Scott, "Input Devices and Interaction Techniques for Advanced Computing," as available on Feb. 19, 1996 at http://www,cis.uoguelph.ca/facultyinfo/mac/papers/barfield.html, pp. 1–23.

McDonough John, "Do the Electric Glide," as available on Feb. 19, 1996 at http://www.byte.com/art/9504/sec13/art9.html, one page.

Morris Bruce, "I Need a Tablet?," as available on Feb. 19, 1996 at http://www.awa.com/nct/hardware/needtab.html, two pages.

Primary Examiner—William M. Shoop, Jr.
Assistant Examiner—Marlon T. Fletcher
Attorney, Agent, or Firm—Townsend and Townsend and Crew LLP

[57] ABSTRACT

A system and method for detecting, measuring the intensity of, and determining the location of a deformation of a membrane. In one embodiment, the intensity and location of membrane deformations is used as control input to a sound generation system that simulates the sound of a drum. The disclosed system and method may be capable of responding to distinct simultaneous deformations of the membrane.

41 Claims, 14 Drawing Sheets

SYSTEM AND METHOD FOR DETECTING DEFORMATION OF A MEMBRANE

STATEMENT OF RELATED APPLICATIONS

This application claims the benefit of U.S. application Ser. No. 08/682,138, filed Jul. 17, 1996, the disclosure of which is incorporated by reference.

This application is a continuation-in-part of commonly assigned U.S. patent app. Ser. No. 08/682,138, entitled MEANS FOR DETECTING AND UTILIZING MEMBRANE DEFLECTION, filed Jul. 17, 1996, now abandoned, the contents of which are herein incorporated by reference.

BACKGROUND OF THE INVENTION

The present invention relates to a user input device and more particularly to a user input device having a membrane wherein deformation of the membrane may be measured and localized.

Various user input devices wherein a user inputs location information by applying pressure to a particular location on the device. If the device is an input to a computer system, the location of the user's application of pressure may be used to position a cursor on a display, for example. Other applications include computer-aided-drafting (CAD) and entry of handwritten text.

Such user input devices have various structures and theories of operation. For example, one device provides that a conductive sheet is superimposed over a resistive sheet. The resistive sheet has a voltage $V_1$ at an upper edge and a voltage $V_2$ at a lower edge. When the user applies pressure at a location on the resistive sheet, the corresponding location on the conductive sheet becomes connected to a voltage divider which provides a voltage between $V_1$ and $V_2$ having a magnitude dependent on location relative to the upper and lower edges. By measuring the voltage on the conductive sheet, the location of the applied pressure can be determined along an axis between the upper and lower edges. To find the location along the other axis, voltages $V_1$ and $V_2$ are applied to the left and right edges instead.

Various other devices detect the location and/or magnitude of user application of pressure by monitoring capacitance, inductance, voltage generated by a piezoelectric material etc. All of the prior art devices, however, share common shortcomings. The devices cannot detect simultaneous application of pressure to two or more locations. Furthermore, in measuring the amount of pressure applied, the devices provide poor dynamic range.

SUMMARY OF THE INVENTION

The present invention provides a system and method for detecting, measuring the intensity of, and determining the location of a deformation of a membrane. In one embodiment, the intensity and location of membrane deformations is used as control input to a sound generation system that simulates the sound of a drum. A system according to the present invention may be capable of responding to distinct simultaneous deformations of the membrane.

A first aspect of the present invention provides a system for detecting deformation of a membrane including: a membrane having a surface wherein at least a portion of the surface is reflective, an emitter disposed to shine electromagnetic radiation toward a location on the at least partially reflective surface, and a detector disposed to receive the electromagnetic radiation as reflected by the reflective material at the location. A deformation of the membrane at the location alters intensity of the electromagnetic radiation as received by the detector.

A second aspect of the present invention provides a system for detecting pressure on a membrane and estimating position of the pressure on the membrane. The system includes: a membrane having a surface wherein at least a portion of the surface is reflective, a plurality of emitters disposed to shine electromagnetic radiation toward a plurality of locations on the surface, and a plurality of detectors disposed to receive the electromagnetic radiation as reflected by the reflective material. A position of a deformation of the membrane is indicated by electromagnetic radiation intensity as received by at least one of the plurality of detectors.

A third aspect of the present invention provides a computer system. The computer system includes an input device, a position resolving system, and a processor. The input device includes a membrane having a surface having at least a portion that is reflective, a plurality of emitters disposed to shine electromagnetic radiation toward a plurality of locations on the reflective material, and a plurality of detectors disposed to receive the electromagnetic radiation as reflected by the surface. A position and an intensity level of a deformation of the membrane is indicated by electromagnetic radiation intensity as received by at least one of the plurality of detectors. A plurality of selected locations on the membrane are specified by a pair of emitter and detector. Electromagnetic radiation emitted by the emitter of the pair and received by the detector of the pair are reflected by a corresponding unique location of the plurality. The position resolving system monitors deformation at a particular location of the plurality of selected locations by stimulating the emitter of the pair specifying the particular location and monitoring output of the detector of the pair specifying the particular location. The position resolving system monitors deformation at successive particular locations of the plurality of selected locations. The processor controls operation of the position resolving system.

A fourth aspect of the present invention provides a method for operating a user input device. The method includes steps of: providing a membrane having a surface wherein at least a portion of the surface is reflective, providing a plurality of emitters disposed to shine electromagnetic radiation toward a plurality of locations on the reflective material, and providing a plurality of detectors disposed to receive the electromagnetic radiation as reflected by the reflective material wherein a position and an intensity level of a deformation of the membrane is indicated by electromagnetic radiation intensity as received by at least one of the plurality of detectors. A plurality of selected locations on the membrane are specified by a pair of emitter and detector. Electromagnetic radiation emitted by the emitter of the pair and received by the detector of the pair are reflected by a corresponding unique location of the plurality of selected locations. The method includes a further step of monitoring deformation at a particular location of the plurality of selected locations by stimulating the emitter of the pair specifying the particular location and monitoring output of the detector of the pair specifying the particular location.

A further understanding of the nature and advantages of the inventions herein may be realized by reference to the remaining portions of the specification and the attached drawings.

DESCRIPTION OF SPECIFIC EMBODIMENTS

Figure 1A:
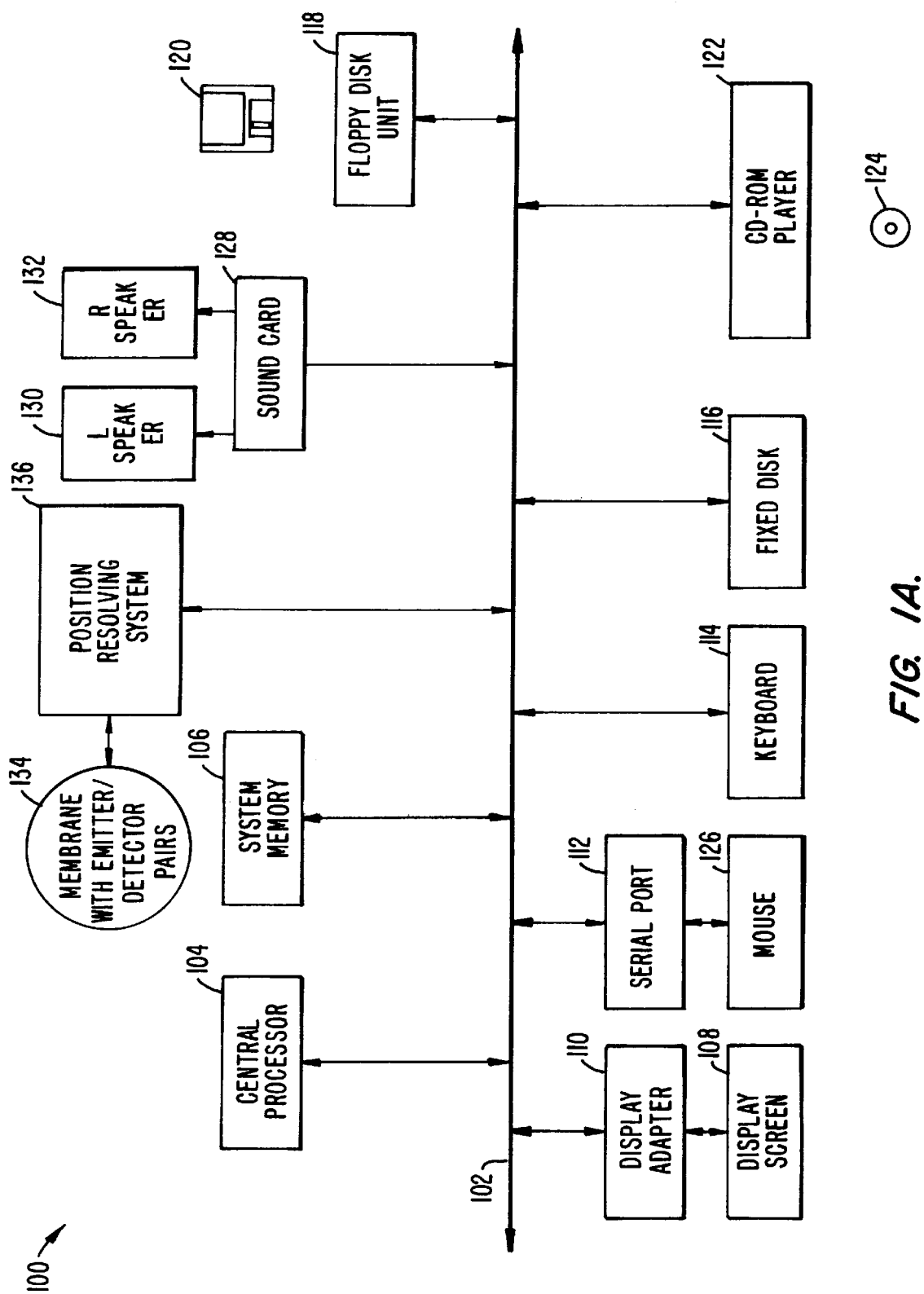
FIG. 1A depicts a computer system embodiment of the present invention.

FIG. 1A depicts a computer system embodiment of the present invention. A computer system 100 includes a bus 102 which interconnects major subsystems such as a central processor 104, a system memory 106, a display screen 108 via a display adapter 110, a serial port 112, a keyboard 114, a fixed disk drive 116, a floppy disk drive 118 operative to receive a floppy disk 120, and a CD-ROM player 122 operative to receive a CD-ROM 124. A mouse 126 is connected via a serial port 112. A sound card 128, such as the SoundBlaster® available from the assignee of the present application, drives a left speaker 130 and a right speaker 132 responsive to received audio control data. Software useful in implementing the present invention and audio data may be operably disposed in system memory 106 or stored on storage media such as a fixed disk 116, on floppy disk 120, or on CD-ROM platter 124.

In accordance with the present invention, computer system 10 is enhanced with an additional user input device 134 which includes a membrane and pairs of emitters and detectors for determining the intensity and location of a deformation of the membrane, as caused by, e.g., a user's touch. User input device 134 may be used to e.g., control placement of one or multiple cursors on display screen 108, control drawing of objects on display screen 108, or control parameters of sound generation by sound card 132. The present invention may be used to provide input to any software or hardware associated with or connected to computer system 10.

Associated with user input device 134 is a position resolving system 136. Position resolving system 136 applies stimulus to emitters of user input device 134 and monitors outputs of detectors of user input device 134. Position resolving system 136 then operates to interpret the detector output to determine the intensity and location of a deformation of the membrane resulting, for example, from a user's touch. Position resolving system 136 is depicted as a hardware entity connected to bus 102 but the control of stimulation and interpretation of detector output may be performed by other hardware such as central processor 104 under the control of software. Hardware to implement position resolving system 136 may be physically packaged with user input device 134. The operation of position resolving system 136 in conjunction with user input device 134 will be explained in greater detail below.

Figure 1B:
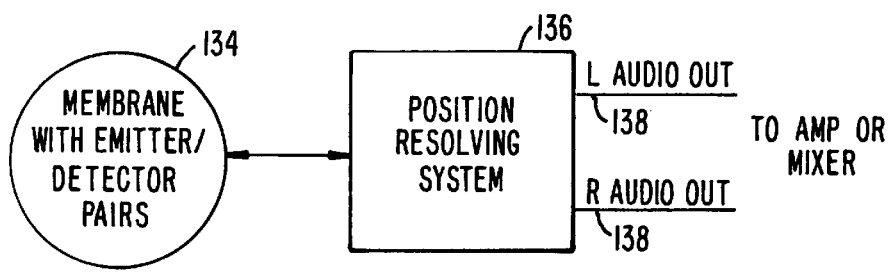
FIG. 1B depicts a stand alone embodiment of the present invention.

The present invention is not limited to computer applications of user input device 134 and position resolving system 136. For example, FIG. 1B depicts an alternative embodiment wherein position resolving system 136 further incorporates a sound generation control system (not shown) that outputs analog sound signals to left and right audio outputs 138. This sound generation control system may map detector outputs to stored digital representations of musical instrument sound, or other parameters that control sound generation. In one embodiment the sounds produced cause the user experience of manipulating user input device 134 to simulate the experience of playing a drum. Outputs 138 may be provided directly to an amplifier or a mixer.

Figure 1C:
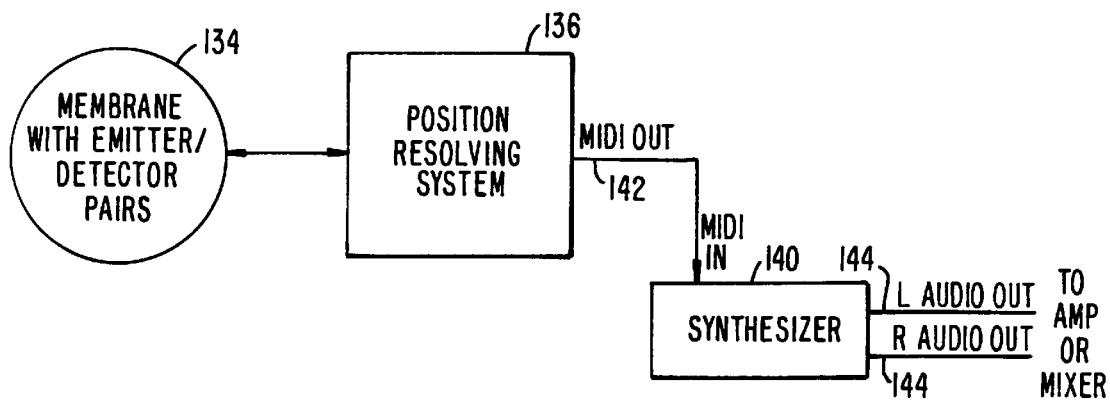
FIG. 1C depicts a synthesizer embodiment of the present invention.

FIG. 1C depicts an alternative embodiment wherein sound generation control functionality is partially shifted into a conventional synthesizer 140. Position resolving system 136 maps detector outputs from user input device 134 into MIDI data. The data is presented on a MIDI data output 142 which is fed to synthesizer 140. Synthesizer 140 can integrate the received MIDI data with other received sound generation control data and user control input to develop analog audio output signals 144 for an amplifier or mixer.

Figure 2:
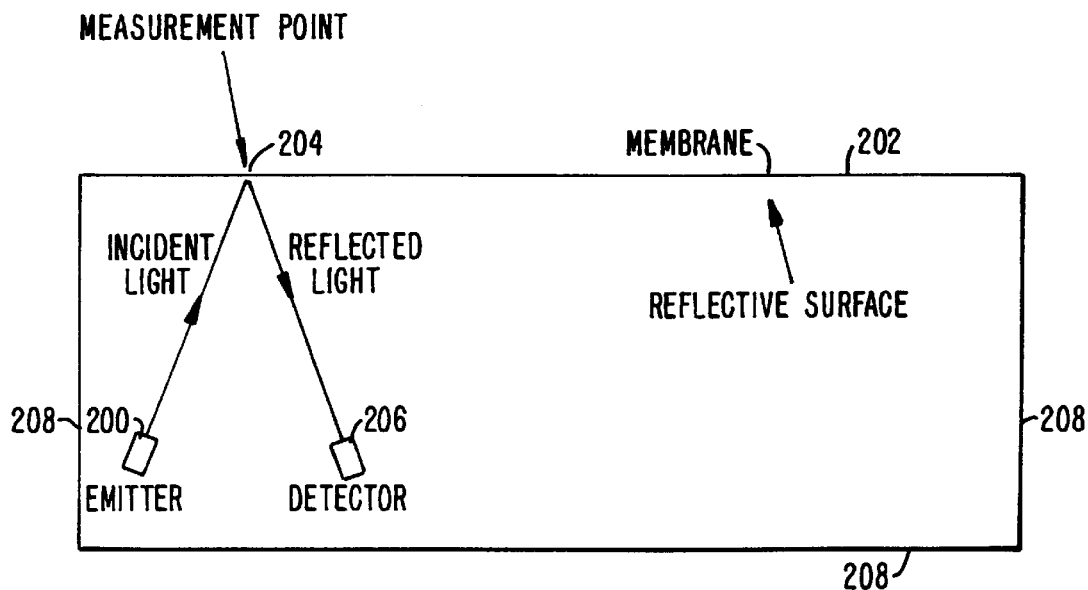
FIG. 2 depicts an emitter/detector pair in combination with a membrane that has not been deformed in accordance with one embodiment of the present invention.

FIG. 2 depicts internal operation of user interface device 134. There is shown a light emitter/detector pair in combination with a membrane that has not been deformed in accordance with one embodiment of the present invention. FIG. 2 illustrates a single pair. The preferred embodiment employs many such pairs. An emitter 200 generates a beam of electromagnetic radiation, e.g., light, which impinges upon the lower surface of a membrane 202 at a measurement point 204. The lower surface of a membrane 202 is at least partially covered with a reflective material. Membrane 202 may be a smooth plastic membrane with a vacuum deposition of aluminum or silver, for example. If there is no deformation of the membrane at measurement point 204, the electromagnetic radiation reflects to a detector 206. Emitter 200 and detector 206 are disposed in relationship to measurement 202 to assure that the electromagnetic radiation reaches detector 206 when the no deformation condition is satisfied. The output of detector 206 is an electrical signal proportional to the intensity of the received electromagnetic radiation. In one embodiment, emitter 200 is a light emitting diode (LED) and detector 206 is a photo detector. Emitter 200 and detector 206 are within an opaque structure 208 underneath membrane 202 such that, e.g., ambient light, does not interfere with the measurement.

Figure 3:
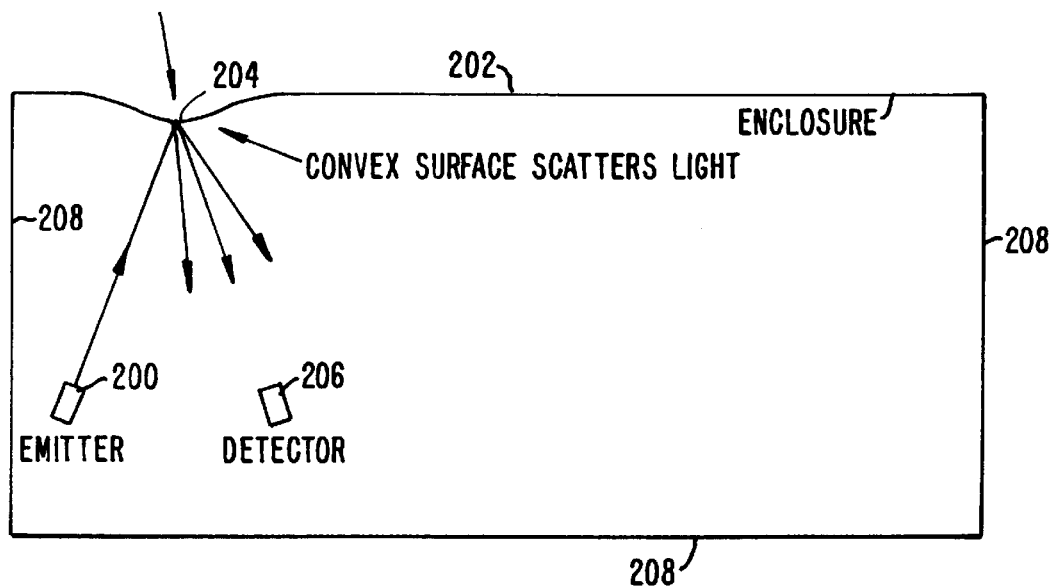
FIG. 3 depicts an emitter/detector pair in combination with a membrane that has been deformed in accordance with one embodiment of the present invention.

FIG. 3 depicts the components shown in FIG. 2 but now membrane 202 is deformed at measurement point 204. The deformation may be a result of impact or pressure on membrane 202 right at measurement point 204 as depicted, but also may be a result of pressure at some distance away from measurement point 204. As can be seen, the lower surface of membrane 202 is now convex at measurement point 204 and scatters electromagnetic radiation from emitter 200. The area surrounding measurement point 204 changes from a flat mirror to a convex mirror. The magnitude of the signal produced by detector 206 is inversely related to the degree of deformation, and yields an accurate and highly reproducible measurement of deformation.

In some embodiments, a diffusive surface is interposed in the path between emitter 200 and detector 206 to diffuse the electromagnetic radiation. For example, emitter 200 may have a diffusive mask over its output, or the reflective surface of membrane 202 may be made diffusive. Alternatively, a diffusive sheet may be placed parallel to membrane 202. This increases the effective diameter of measurement points and increases improving the user experience.

By employing an array of multiple emitters and multiple detectors, one can monitor the deformation of membrane 202 at a multiple points. Given appropriate array geometries, one can monitor a number of measurement points equal to the product of the number of emitters times the number of detectors.

Figure 7:
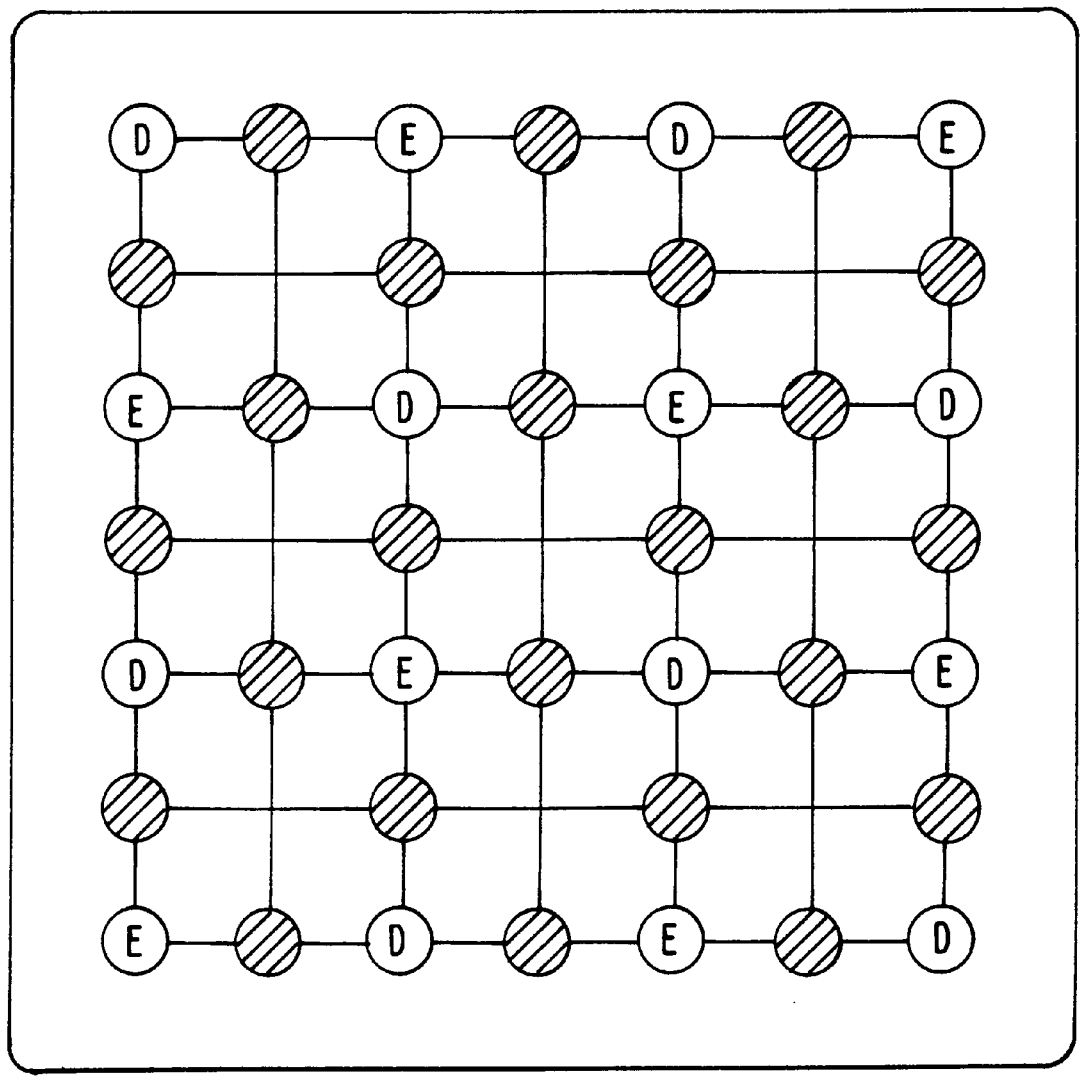
FIG. 7 depicts an array of 8 emitters and 8 detectors in accordance with one embodiment of the present invention.
Figure 8:
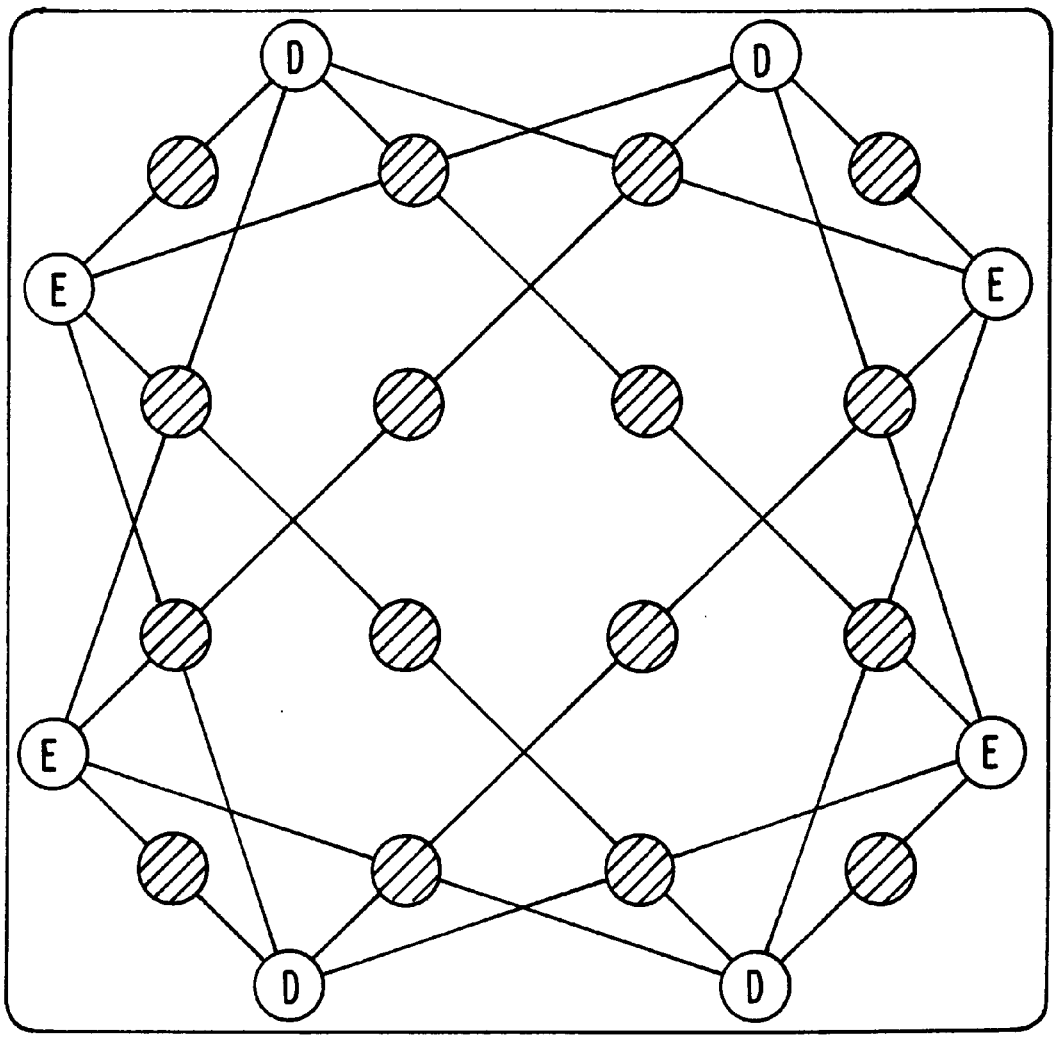
FIG. 8 depicts an array of 4 emitters and 4 detectors in accordance with one embodiment of the present invention.
Figure 9:
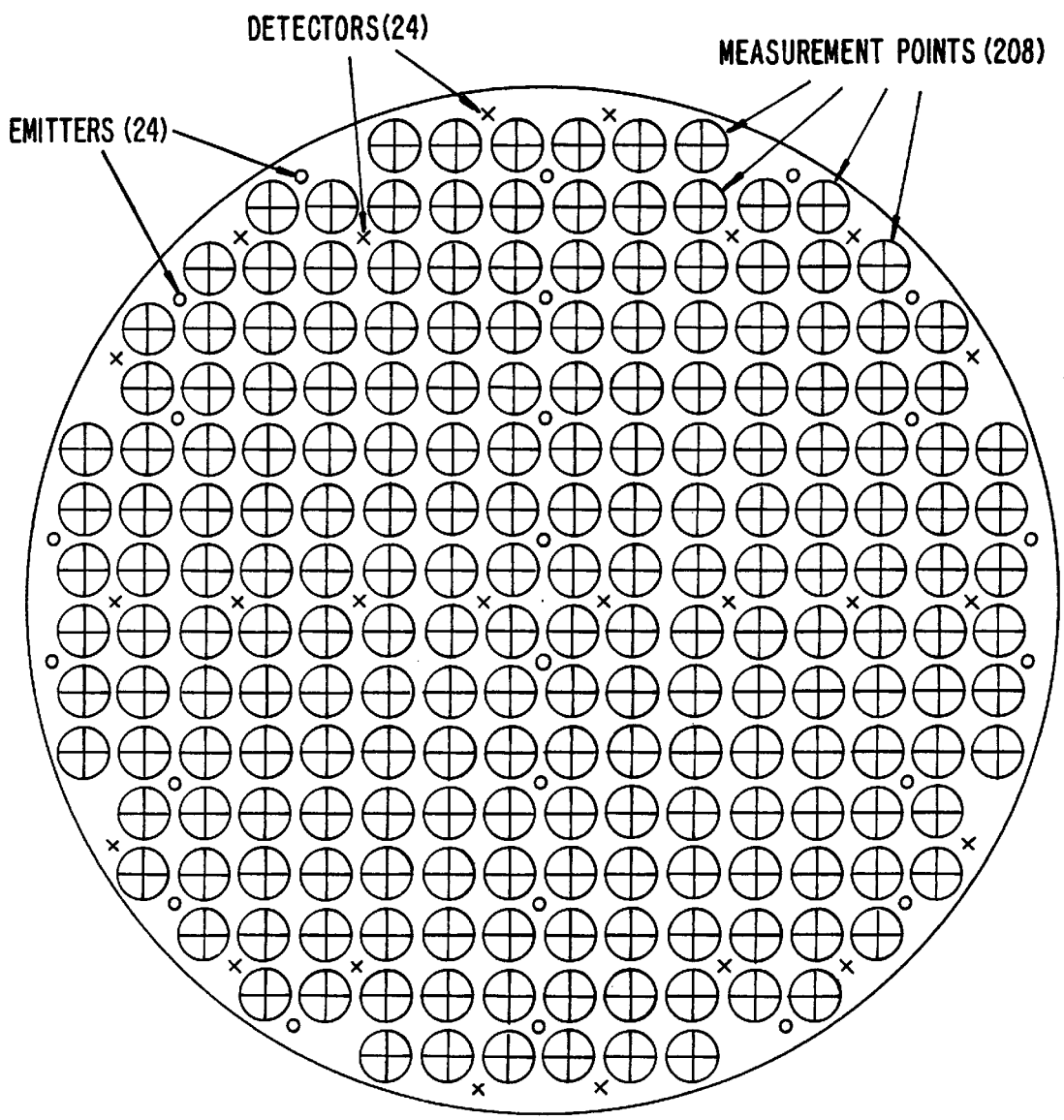
FIG. 9 depicts a first array of 24 emitters and 24 detectors in accordance with one embodiment of the present invention.
Figure 10:
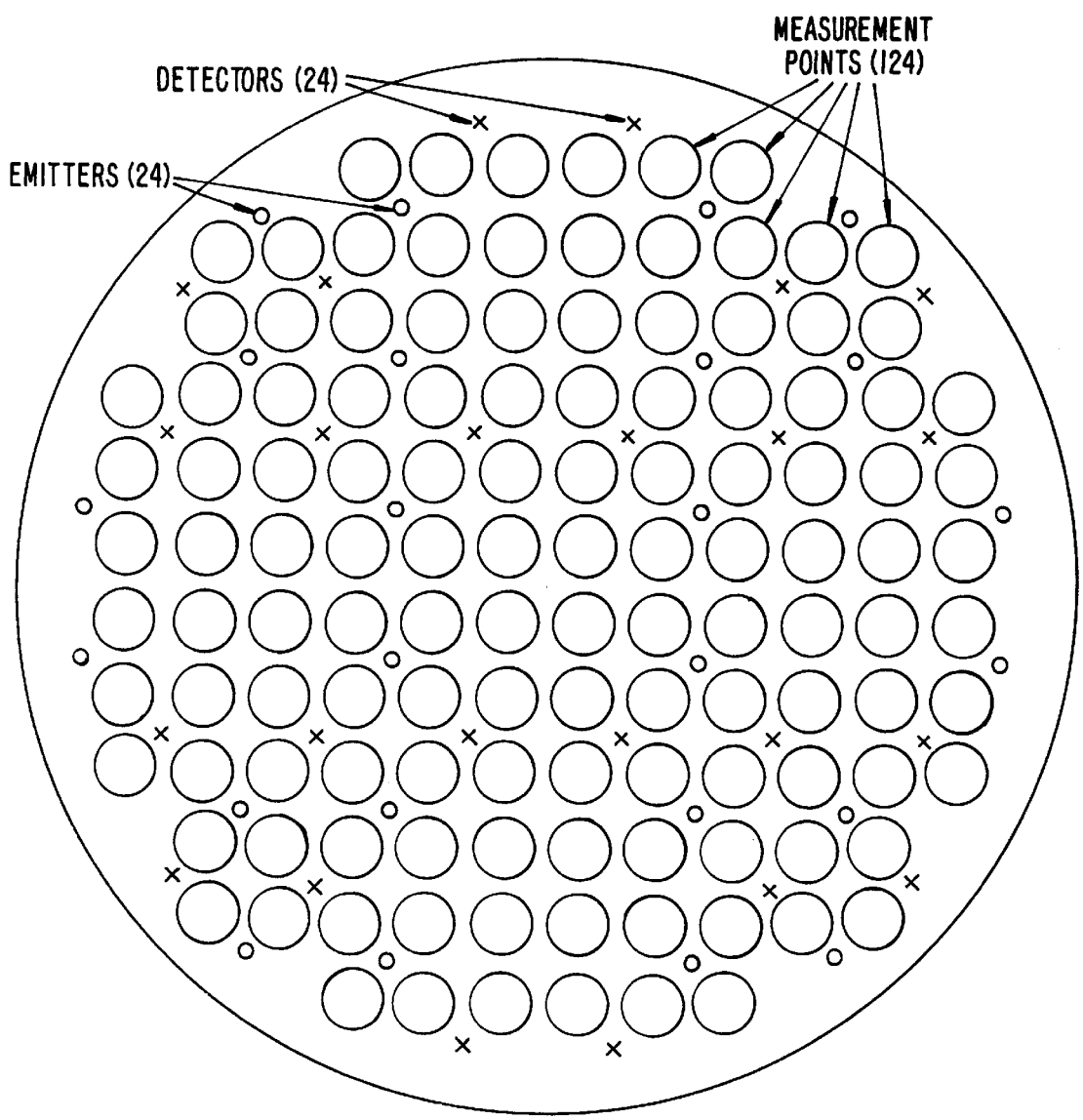
FIG. 10 depicts a second array of 24 emitters and 24 detectors in accordance with one embodiment of the present invention.

FIGS. 4–10 represent various configurations of emitters and detectors. Each configuration is shown in a top view relative to membrane 202. In FIGS. 4–8, each circle with an E inside represents an emitter position, each circle with a D inside represents a detector position, and each darkened circle represents a measurement point. In FIGS. 9 and 10, emitters are marked with x's and detectors are marked as o's, and each circle with a "+" inside represents a measurement point. In FIGS. 4–6, and FIG. 8 the dark lines between emitter and detectors show the path taken by electromagnetic radiation traveling between the emitter and detector of a particular pairing. Each emitter may transmit electromagnetic radiation to more than one detector. Similarly, each detector may receive electromagnetic radiation from more than one emitter. It is the function of position resolving system 136 to strategically stimulate the emitters and monitor the detectors to determine the location and intensity of one or more deformations of membrane 202.

Figure 4:
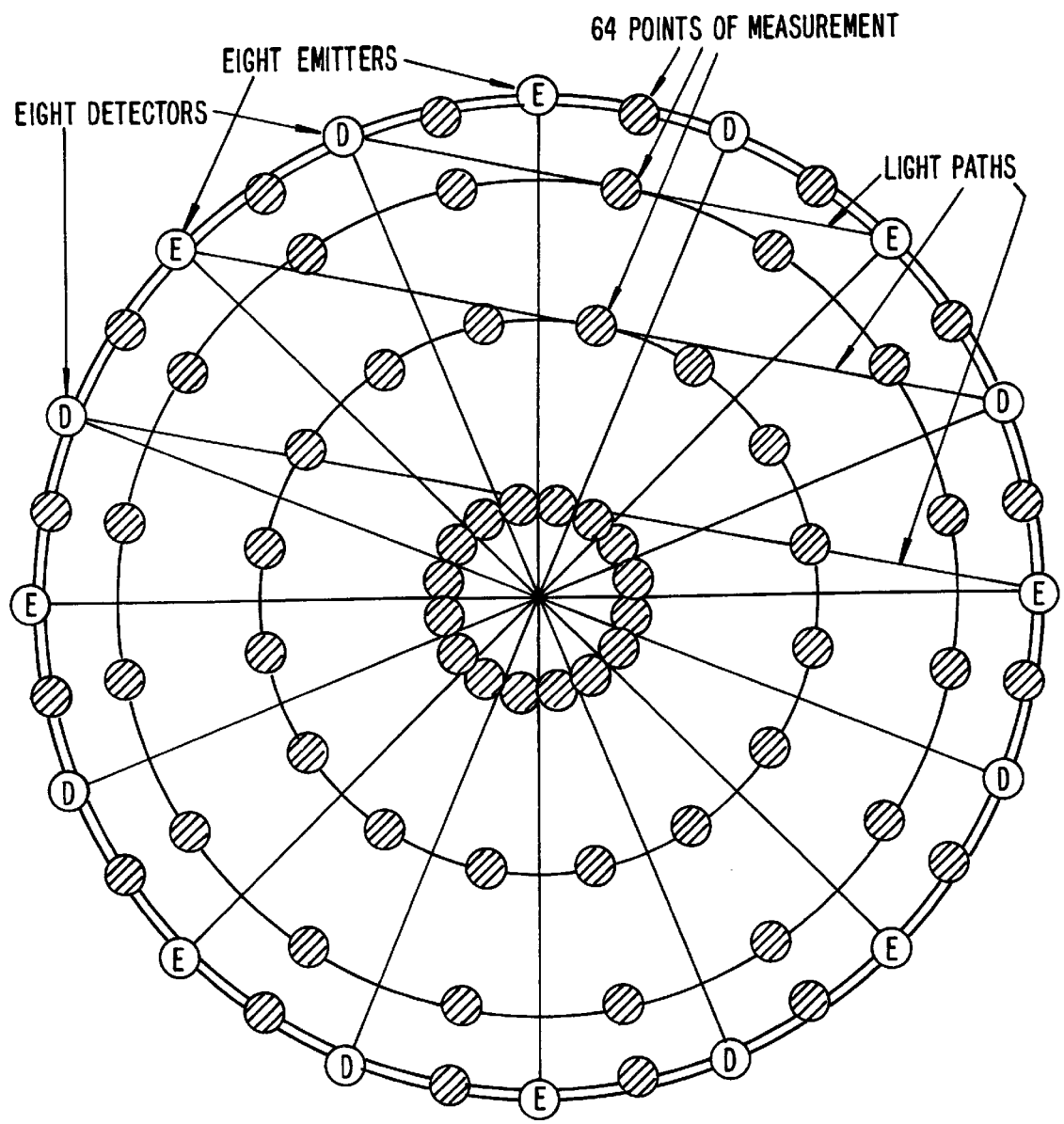
FIG. 4 depicts an array of 8 emitters and 8 detectors in accordance with one embodiment of the present invention.

FIG. 4 depicts an array of 8 emitters and 8 detectors in accordance with one embodiment of the present invention. By sequentially energizing the 8 emitters and monitoring the outputs of the eight detectors, position resolving system 136 may determine the deflection of 64 points.

Figure 5:
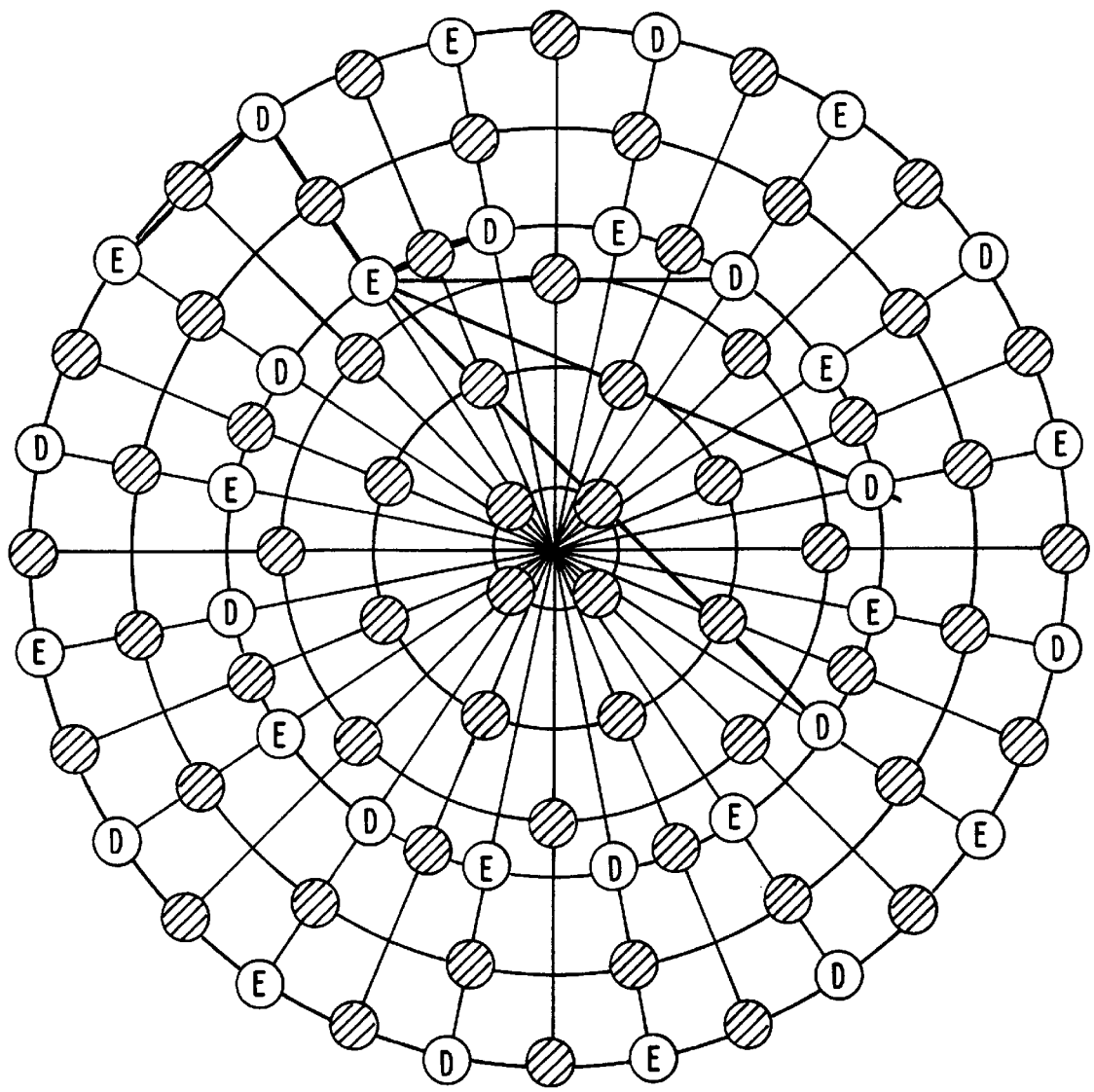
FIG. 5 depicts an array of 16 emitters and 16 detectors in accordance with one embodiment of the present invention.
Figure 6:
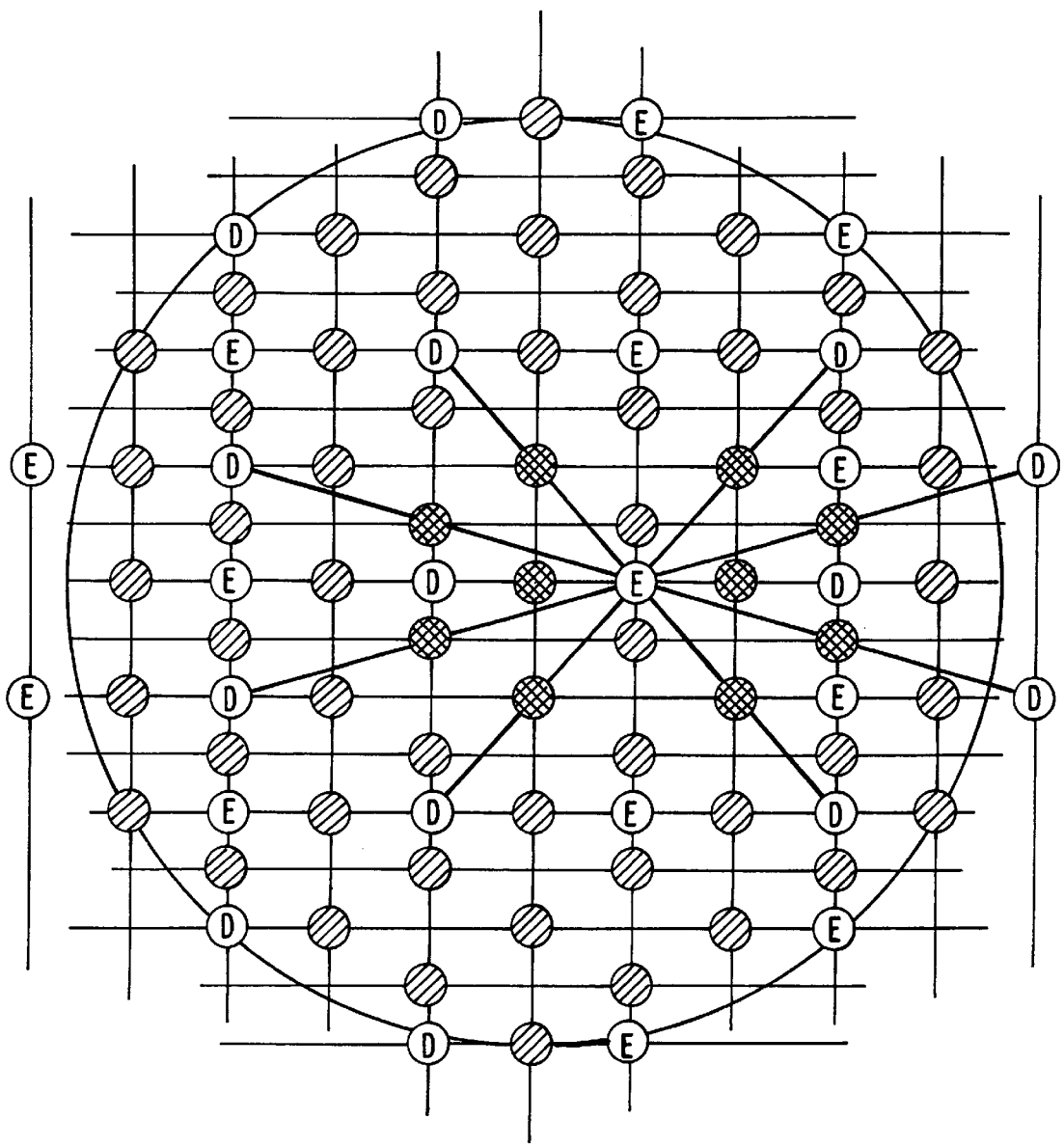
FIG. 6 depicts an array of 14 emitters and 14 detectors in accordance with one embodiment of the present invention.

By varying the number and distribution of emitters and detectors, one can vary resolution and select a coordinate system for localizing membrane deformation. FIG. 5 depicts an array of 16 emitters and 16 detectors in accordance with one embodiment of the present invention. The array of FIG. 5 provides a rotational coordinate system for resolving location. FIG. 6 depicts an array of 14 emitters and 14 detectors in accordance with one embodiment of the present invention. The array of FIG. 6 effectively divides membrane 202 into hexagonal regions surrounding each measurement point.

FIG. 7 depicts an array of 8 emitters and 8 detectors in accordance with one embodiment of the present invention. FIG. 8 depicts an array of 4 emitters and 4 detectors in accordance with one embodiment of the present invention. The rectangular arrays of FIGS. 7–8 define rectangular coordinate systems, suitable for use in touch activated tablet embodiments of user input device 134, exhibiting sensitivity to pressure as well as location, and responding to multiple simultaneous touch.

FIG. 9 depicts a preferred array of 24 emitters and 24 detectors in accordance with one embodiment of the present invention. The 24 emitters and 24 detectors define 206 measurement points on a uniform rectangular grid. The diameter of the array is preferably approximately 10 inches. The mirrored surface is made slightly diffusing. This provides a measurement accuracy of 0.15 inches with repeatability and resolution of 0.05 inches. Pressure is derived from deflection measurements and impact velocity from the rate of change of deflection. The usable pressure range is from 1 oz. to about 50 oz.

FIG. 10 depicts a second array of 24 emitters and 24 detectors in accordance with one embodiment of the present invention. The array of FIG. 10 gives 124 measurement points.

Figure 11:
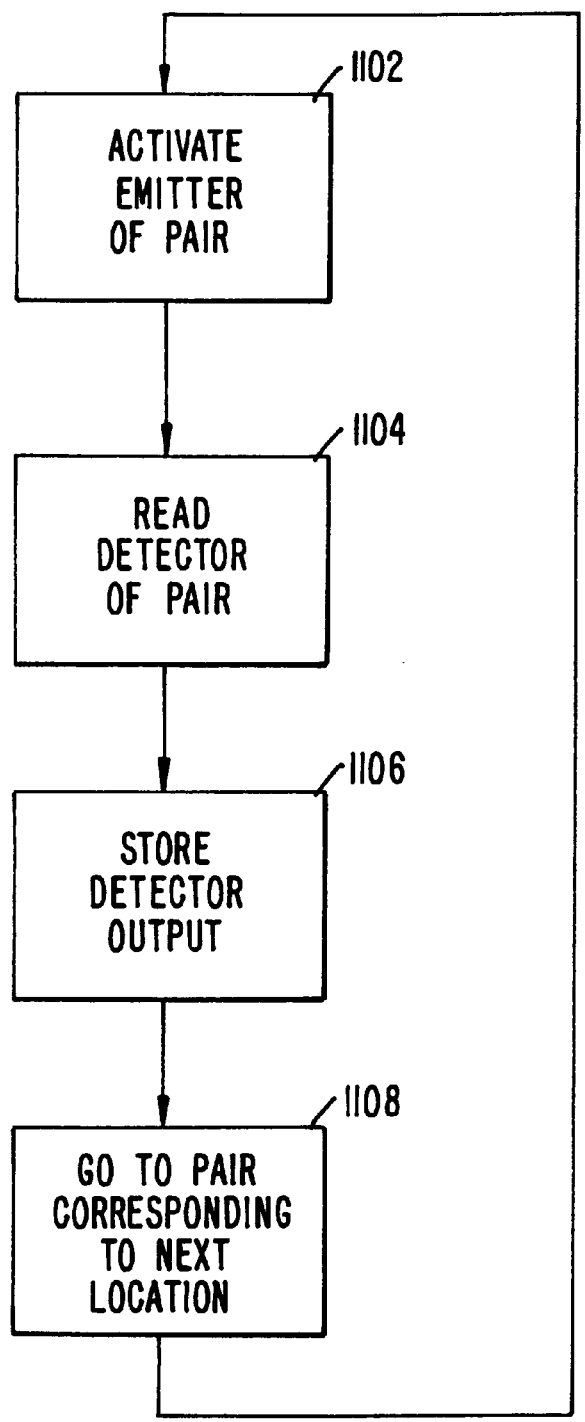
FIG. 11 depicts a first flowchart describing steps of operation of one embodiment of the present invention.

FIG. 11 depicts a first flowchart describing steps of operation of one embodiment of the present invention. The steps of FIG. 11 represent a background process that continuously scans through each measurement point of an array on membrane 202. For a particular measurement point, there is a corresponding emitter/detector pair. At step 1102, position resolving system 136 stimulates the emitter of the pair. At step 1104, position resolving system 136 monitors the detector of the pair to determine the intensity of deformation there. Small signal magnitudes indicate a high degree of scattering and large deformation. Maximum signal magnitude occurs where there is no scattering and thus no deformation. At step 1106, a quantity indicating the measured deformation is stored in a table. At step 1108, position resolving system 136 proceeds to the next location by addressing the next emitter/detector pair and repeating steps 1102 through 1106. The process thus repeats for each measurement point in the array. In a preferred embodiment, a complete scan through all the measurement points completes within approximately 2 milliseconds. This eliminates any user perception of delay and allows for real-time response to multiple simultaneous deformations of membrane 202.

Figure 12:
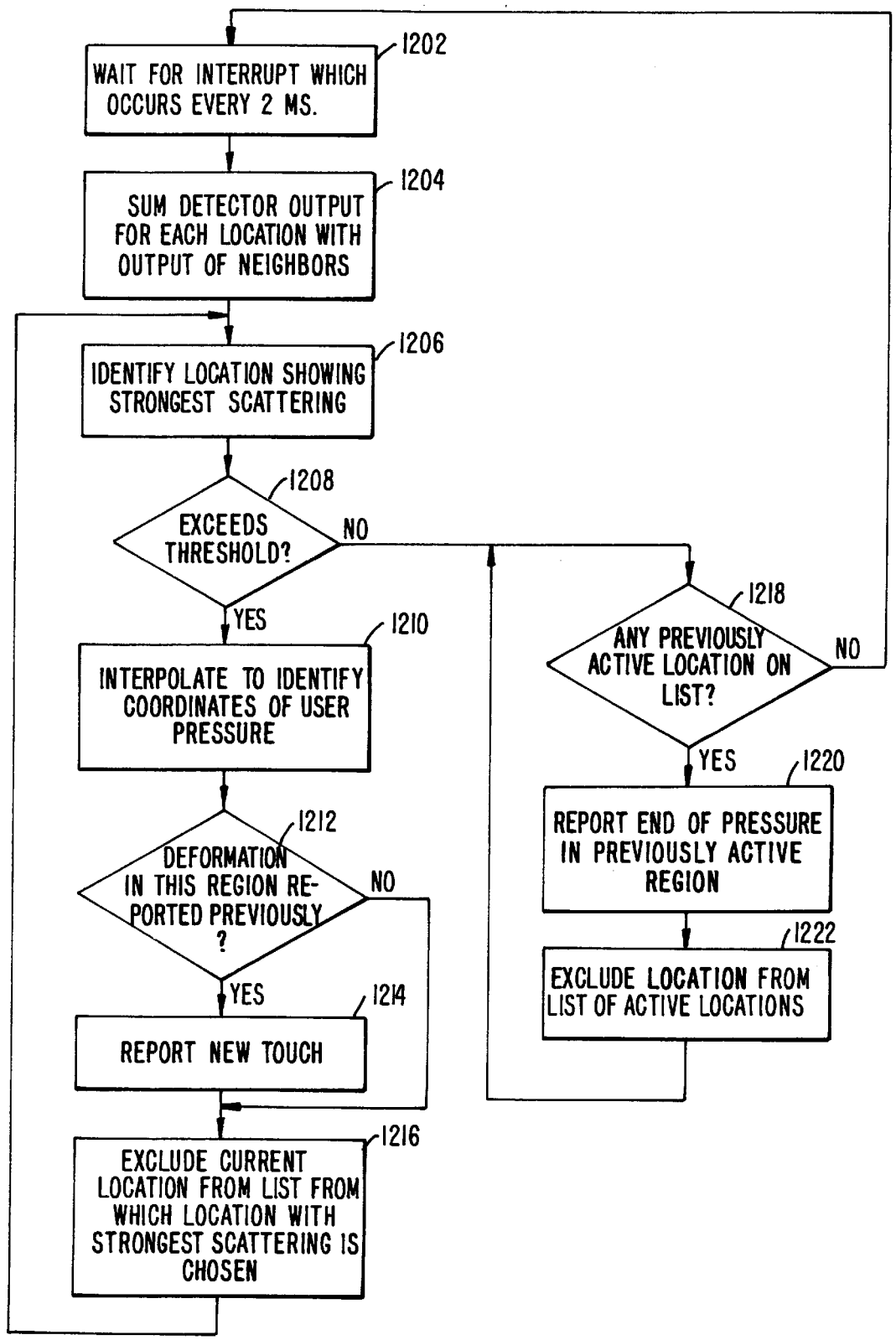
FIG. 12 depicts a second flowchart describing steps of operation of one embodiment of the present invention.

FIG. 12 depicts a second flowchart describing steps of operation of one embodiment of the present invention. The steps of FIG. 12 occur concurrently with the steps of FIG. 11. At step 1202, location resolving system 136 waits for an interrupt that occurs at an interval corresponding to a complete scan through all the measurement points, preferably 2 milliseconds. At step 1204, location resolving system 136 sums the measured deformation for each measurement point with the measurements its nearest neighbors to obtain a smoothed response for measurement point. These smoothed responses are stored in a table.

At step 1206, location resolving system 136 identifies the measurement point whose smoothed response shows the strongest scattering effect and thus the greatest deformation. At step 1208, location resolving system 136 determines if this measurement point exceeds a threshold. If the deformation does exceed the threshold, processing continues to step 1210, where interpolation is applied to determine x and y coordinates of application of pressure to membrane 202. Note that the interpolation calculation uses the measurement point responses without the summing of the other measurement points. Further details of interpolation are described with reference to FIGS. 13–14. At step 1212, location resolving system 136 determines if deformation in this region was observed previously. If deformation was not observed previously, processing proceeds to step 1214 where location resolving system 136 reports a new application of pressure to the region and adds this region to the list of active regions. If deformation of the region was observed previously, or after step 1214, location resolving system 136 removes this region from the list from which the region having the greatest deformation is identified. Then processing returns to step 1206 to identify the region having the next greatest deformation. The effect of steps 1202 to 1206 is to identify and report the positions of individual deformations of membrane 202 and to add where necessary to a list of measurement points currently having deformation activity.

If a measurement point's deformation is found to not exceed the threshold at step 1208, processing continues to step 1218. This indicates that no measurement points are currently active, or that all active measurement points have already been processed. At step 1218, location resolving system 136 checks if there any active measurement points on the active measurement point list that have not been determined to be currently active by step 1208. If there are such previously active measurement points on the active measurement point list, location resolving system 136 selects one of the previously active measurement points and reports the end of activity in that region at step 1220. Then at step 1222, location resolving system 136 removes this previously active measurement point from the list of active measurement points. The process of reporting measurement point that are no longer active and removing them from the active measurement point list then continues at step 1218. Once the list has been updated this way, there are no longer any inactive measurement points on the active measurement point list and location resolving system 136 again awaits an interrupt at step 1202.

Figure 13:
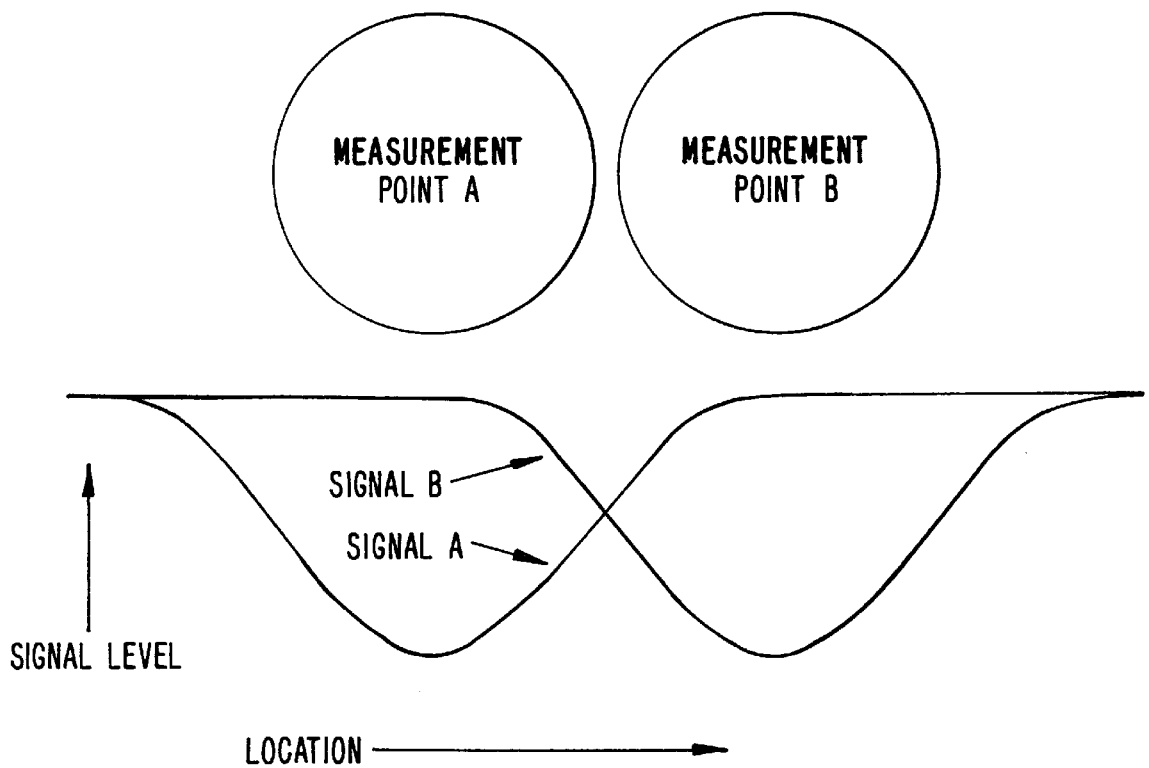
FIG. 13 is a first illustration useful in describing an interpolation procedure according to one embodiment of the present invention.

FIG. 13 is a first illustration useful in describing an interpolation procedure according to one embodiment of the present invention. A touch applied at a location somewhere between two measurement points will cause deflection at both points. By comparing the resultant signals from the two points, the location of the touch may be determined. Referring to FIG. 13, the two measurement points are called A and B. The signals, a and b, that are generated by moving a finger along the surface (in a line intersecting A and B) are depicted below the measurement points. If a touch lies between the two points, its location can be determined from the formula for linear interpolation:

$$x = \frac{b}{a+b}$$

Figure 14:
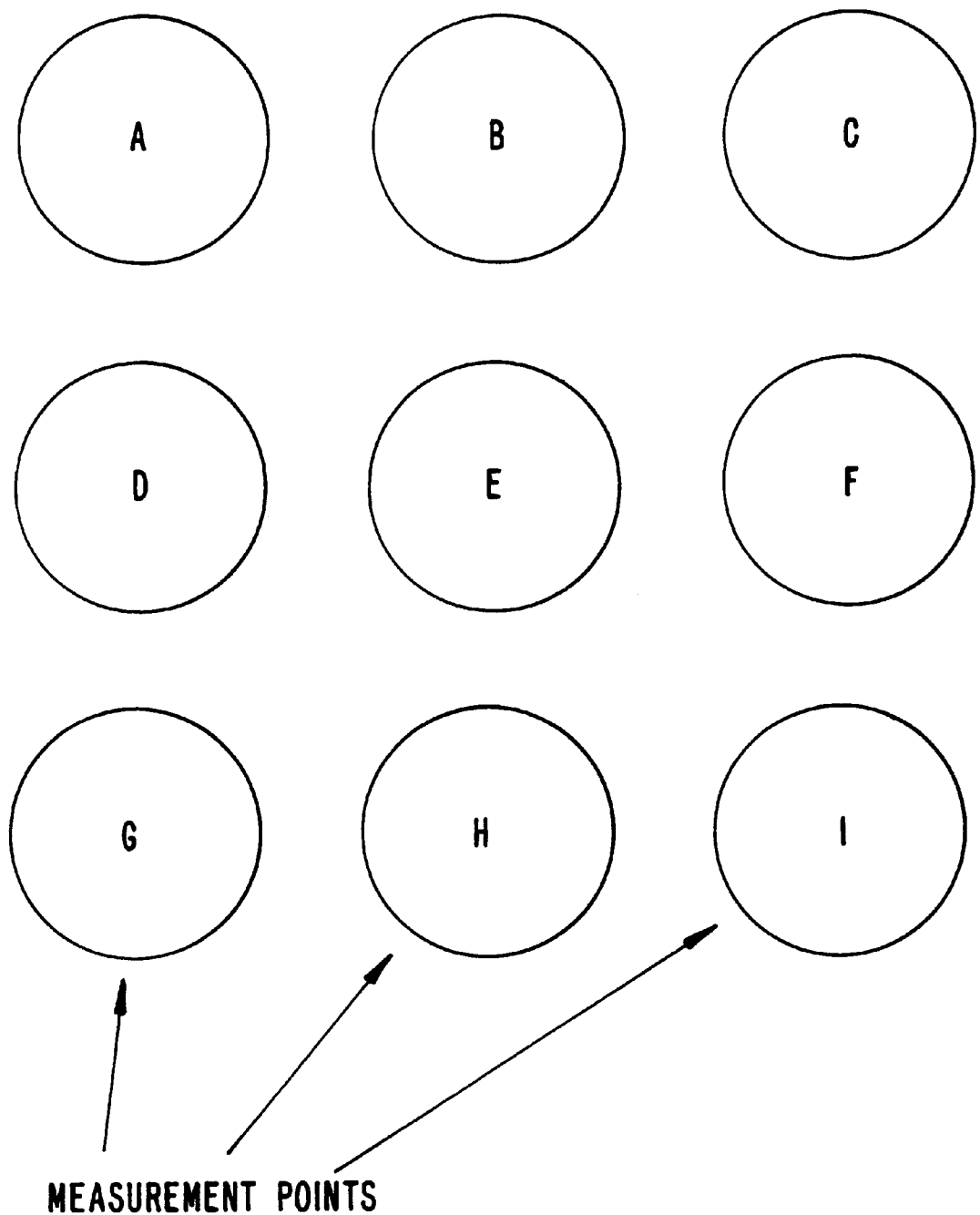
FIG. 14 is a second illustration useful in describing an interpolation procedure according to one embodiment of the present invention.

FIG. 14 is a second illustration useful in describing an interpolation procedure according to one embodiment of the present invention. The one-dimensional scenario is easily extended to two-dimensional applications as found in the preferred embodiment. FIG. 14 shows nine measurement points. The x and y coordinates for a deformation are found by:

$$x = \frac{b+e+h+2c+2f+2i}{a+b+c+d+e+f+g+h+i}$$

$$y = \frac{d+e+f+2a+2b+2c}{a+b+c+d+e+f+g+h+i}$$

Note that the interpolation procedures of FIGS. 13–14 are merely representative.

For musical applications, a sound generation control system such as sound card 128 or circuitry within position resolving system 136 controls musical output responsive to the location and intensity of deformations of membrane 202. For a drum application, sound card 128 generates drum sounds responsive to pressure on membrane 202. If a cell approach is taken, wherein the membrane is considered divided into one or more cells, sound generation can respond to pressure in one or more cells. The volume assigned to a sound, may relate to the magnitude of the deformation. One may use the rate of change of the deformation as a control parameter.

In the foregoing specification, the invention has been described with reference to specific exemplary embodiments thereof. It will, however, be evident that various modifications and changes may be made thereunto without departing from the broader spirit and scope of the invention as set forth in the appended claims and their full scope of equivalents.

What is claimed is:

1. A system for detecting deformation of a membrane comprising:
   a membrane having a surface;
   an emitter disposed to impinge, upon a segment of said surface, electromagnetic radiation, with a portion of said electromagnetic radiation impinging upon said segment being reflected therefrom along a reflected path; and
   a detector having an electromagnetic radiation collection area lying in said reflected path, with said segment being adapted to reflect, in a first state, substantially all electromagnetic radiation impinging thereupon along said reflected path, defining reflected radiation, and scattering, in a second state, a portion of said reflected radiation away from said reflected path.

2. The system of claim 1 wherein said segment is substantially planar in said first state and has an arcuate shape in said second state. defining a deformation, wherein said deformation alters intensity of said reflected radiation impinging upon said detector.

3. The system of claim 1 wherein said segment is substantially planar in said first state and has an arcuate shape in said second state, defining a deformation, wherein said deformation reduces intensity of said reflected radiation impinging upon said detector.

4. The system of claim 1 wherein said detector generates an electrical signal corresponding to an intensity of said reflected radiation impinging thereupon and further comprising:
   a sound generation control system connected to receive said electrical signal to control sound generation parameters in response thereto.

5. The system of claim 4 wherein said membrane includes opposed major surface, one of which includes said surface and said deformation corresponds to a pressure differential between opposing major surfaces.

6. The system of claim 1 wherein said emitter comprises a light emitter and said detector comprises a light detector.

7. The system of claim 6 wherein said light emitter comprises an infrared light emitter and said detector comprises an infrared light detector.

8. The system of claim 1 wherein said detector responds to deformation as caused by a user touching said membrane.

9. The system of claim 8 wherein said emitter defines an incident path over which said electromagnetic radiation propagates to impinge upon said segment, with both said incident and reflected paths defining a light path and further including diffusive material positioned within said light path.

10. A system for detecting pressure on a membrane and estimating position of said pressure on said membrane, said system comprising:

a membrane having a surface;

a plurality of emitters, each of which is disposed to direct electromagnetic radiation along an incident path, defining a plurality of incident paths, with said membrane lying in a sub-portion of said plurality of incident paths, said membrane being adapted to reflect electromagnetic radiation impinging thereupon along a reflected path so that each incident path of said sub-portion has a reflected path associated therewith, defining a plurality of reflected paths, with each incident path of said sub-portion being associated with an emitter, of said plurality of emitters, differing from the emitters, of said plurality of emitters, associated with the remaining paths of incident said sub-portion; and a plurality of detectors, a sub-part of which lies in one of said plurality of reflected paths differing from the reflected path in which the remaining detectors of said plurality lie, with the reflected paths associated with said sub-part being associated with said incident paths of said sub-portion and said surface being adapted to reflect, in a first state, substantially electromagnetic radiation impinging thereupon along one said plurality of reflected paths, defining reflected radiation, and scattering, in a second state, a portion of said reflected radiation away from said one of said plurality of reflected paths, wherein each of said detector of said sub-part is uniquely associated with one of said plurality of emitters and a position of deformation of said membrane is indicated by said electromagnetic radiation received by one of said plurality of detectors of said subpart.

11. The system of claim 10 wherein said sub-portion includes all of said plurality of incident paths and said sub-part includes all of said plurality of detectors.

12. The system of claim 10 wherein said sub-portion includes one of said plurality of incident paths and said sub-parts includes one of said plurality of detector.

13. The system of claim 12 wherein one of said plurality of detectors lies in a plurality of reflected paths corresponding to multiple locations of said surface and further comprising a position resolving system that causes said one of said plurality of detectors to be more sensitive to deformation of said membrane at one of said multiple locations by stimulating emission by a selected one of said plurality of emitters and substantially suppressing emission by remaining emitters.

14. The system of claim 13 wherein said electromagnetic radiation comprises light.

15. The system of claim 14 wherein said light comprises infrared light.

16. The system of claim 10 wherein a plurality of selected locations on said membrane are specified by a pair of emitter and detector, electromagnetic radiation emitted by said emitter of said pair and received by said detector of said pair being reflected in by a corresponding unique location of said plurality of selected locations.

17. The system of claim 16 further comprising a position resolving system that monitors deformation at a particular location of said plurality of selected locations by stimulating said emitter of said pair specifying said particular location and monitoring output of said detector of said pair specifying said particular location.

18. The system of claim 17 wherein said position resolving system monitors deformation at successive particular locations of said plurality of selected locations.

19. The system of claim 17 wherein said position resolving system estimates position of a deformation by interpolating between deformations as monitored at least two of said plurality of selected locations.

20. The system of claim 16 wherein said electromagnetic radiation comprises light.

21. The system of claim 20 wherein said light comprises infrared light.

22. The system of claim 18 further comprising a sound generation system that controls sound generation responsive to said position estimated by said position resolving system.

23. The system of claim 18 further comprising a computer system that displays a cursor at a display position selected responsive to said position estimated by said position resolving system.

24. The system of 16 further comprising a position resolving system that monitors deformation at multiple particular locations of said plurality of selected locations by stimulating said emitters of said pairs specifying said particular locations and monitoring outputs of said detectors of said pairs specifying said particular locations.

25. The system of claim 24 further comprising a computer system that displays multiple cursors at positions on a display selected responsive to said deformation of said multiple particular locations.

26. The system of claim 10 further comprising:

an opaque structure underneath said membrane enclosing said plurality of emitters and said plurality of detectors.

27. A computer system comprising:

an input device comprising:

a membrane having a surface;

a plurality of emitters, each of which is disposed to direct electromagnetic radiation along an incident path, defining a plurality of incident paths, with said membrane lying in a sub-portion of said plurality of incident paths, said membrane being adapted to reflect electromagnetic radiation impinging thereupon along a reflected path so that each incident path of said sub-portion has a reflected path associated therewith, defining a plurality of reflected paths, with each incident path of said sub-portion being associated with an emitter, of said plurality of emitters, differing from the emitters, of said plurality of emitters, associated with the remaining paths of said subportion;

a plurality of detectors, a sub-part of which lies in one of said plurality of reflected paths differing from the reflected path in which the remaining detector lie, with the reflected paths associated with said sub-part being associated with said incident paths of said sub-portion and said surface being adapted to reflect, in a first state, substantially electromagnetic radiation impinging thereupon along one said plurality of reflected paths, defining reflected radiation, and scattering, in a second state, a portion of said reflected radiation away from said one of said plurality of reflected paths, wherein each of said detector of said sub-part is uniquely associated with one of said plurality of emitters, defining a plurality of emitter-detector pairs, and a position of deformation of said membrane is indicated by electromagnetic radiation received by one of said plurality of detectors of said subpart, with each emitter-detector pair positioned to sense deformation of a segment of said membrane differing from the segments associated with the remaining emitter-detector pairs;

a position resolving system in data communication with each of said plurality of emitter-detector pairs, that monitors deformation at a particular location of said plurality of selected locations by stimulating one of the emitters of said plurality of emitter-detector pairs and monitoring an output of the detectors associated therewith; and a processor that controls operation of said position resolving system.

28. The computer system of claim 27 further comprising:

a sound generation control system that controls sound generation parameters responsive to said deformation monitored at said plurality of selected locations.

29. The computer system of claim 27 further comprising:

a display adapter that causes display of a cursor at a display position selected responsive to said deformation monitored at said plurality of selected locations.

30. The computer system of claim 27 wherein said position resolving system monitors deformation at multiple particular locations simultaneously.

31. The computer system of claim 30 further comprising:

a display adapter that causes display of multiple cursors at a multiple display positions selected responsive to said deformation monitored at said multiple particular locations.

32. The computer system of claim 27 wherein said electromagnetic radiation comprises light.

33. The computer system of claim 27 wherein said electromagnetic radiation comprises infrared light.

34. A method for operating a user input device comprising steps of:

providing a membrane having a surface;

providing an emitter disposed to impinge, upon a segment of said surface electromagnetic radiation with a portion of said electromagnetic radiation impinging upon said segment being reflected therefrom along a reflected path; providing a detector lying in said reflected path, with said segment being adapted to reflect, in a first state, substantially all electromagnetic radiation impinging thereupon along said reflected path, defining reflected radiation, and scattering, in a second state, a portion of said reflected radiation away from said reflected path, defining scattered electromagnetic radiation and remaining electromagnetic radiation with said detector producing a signal in response to a level of remaining electromagnetic radiation impinging thereupon; and measuring deformation of said segment based upon said signal.

35. The method of claim 34 further comprising a step of:

providing a plurality of emitter and a plurality of detectors positioned to detect deformations of a plurality of selected locations of said membrane and repeating said monitoring step for selected locations of said plurality.

36. The method of claim 35 further comprising a step of:

estimating position of a deformation by interpolating between deformations as monitored at least two of said plurality of selected locations.

37. The method of claim 36 further comprising a step of:

controlling sound generation responsive to said estimated position of said deformation.

38. The method of claim 36 further comprising a step of:

displaying a cursor at a display position selected responsive to said estimated position of said deformation.

39. The method of claim 34 further comprising a step of:

performing said monitoring step for multiple particular locations simultaneously.

40. The method of claim 34 wherein said electromagnetic radiation comprises light.

41. The method of claim 34 wherein said electromagnetic radiation comprises infrared light.

* * * * *